May 2, 1933.　　　G. G. ANDREWS　　　1,906,303
BEAD BUILDING MACHINE
Filed May 25, 1926　　　5 Sheets-Sheet 5

Fig. 10

Inventor
George G. Andrews
By
Attorney

Patented May 2, 1933

1,906,303

UNITED STATES PATENT OFFICE

GEORGE G. ANDREWS, OF AKRON, OHIO, ASSIGNOR TO THE GOODYEAR TIRE & RUBBER COMPANY, OF AKRON, OHIO, A CORPORATION OF OHIO

BEAD BUILDING MACHINE

Application filed May 25, 1926. Serial No. 111,540.

My invention relates to bead building machines and it has particular relation to machines of the above designated character which are adapted to form an annular product of an elongate braid of bead building material.

Pneumatic tires, such for example as are employed on motor vehicles, embody a plurality of plies of rubberized fabric, and a tread portion. In addition, a tire includes two bead rings which form its inner periphery. The character of the bead, which is employed, is governed by the type of rim with which the tire is to be utilized. Two major classes are recognized. One is the clincher bead, which is of an extensible character, and the other the straight side bead which is non-extensible. In order to impart the rigid properties which characterize the straight side bead, it is universal practice to include a metallic material within its structure. This often consists of a braided wire that is impregnated with a rubber composition by passing the braid through what is known as a tubing machine. Several convolutions of a braid so treated are enclosed in a strip of fabric and subsequently united with the plies of fabric and tread to form an integral tire unit.

By my invention I have provided a machine which is adapted to fabricate an annular form of a rubberized metallic braid. The form so produced must subsequently be wrapped with a fabric strip to complete the bead.

One object of my invention is to increase the output of a bead building unit.

Another object of the invention is to provide a novel collapsible drum or form upon which the bead may be constructed.

A further object of my invention is to provide a machine which is automatic in its operation and which will obviate inaccuracies that are incident to manual fabrication.

Heretofore it has been customary to build beads by aligning a strip of fabric about an annular form, after which several turns of rubberized braided wire are superimposed thereon. The edges of the textile material are then turned over to enclose the braid, after which the assembly is removed from the form. The method is distinct from that of the present invention, wherein the rubberized braid is aligned about a collapsible drum, after which the ring thus formed is removed and wrapped circumferentially. The former method was slow, cumbersome, and required an excessive amount of manual labor. Moreover, an extensive reserve supply of braided material was essential for each builder. According to the present method a single tubing machine may be operated continuously to provide sufficient material for two building machines. Furthermore, the operations are simplified by utilizing the machine embodying the principles of my invention, and the sequence of steps is such as to obviate the necessity of large supplies of bead material.

According to my invention, I have provided a festoon device, which is adapted to control the operation of a tubing machine and is provided with means for feeding the building unit intermittently. The bead forming elements include a collapsible form, about which the braid is superimposed. Additional means are provided, whereby the form is rotated any predetermined number of times, after which it is automatically stopped to permit the removal of the assembled product. An automatic clamping mechanism is included, whereby the free end of the braided wire is gripped and held securely on the periphery of the form, until the rotation of the drum is interrupted and the form collapsed to permit the removal of the annular product.

The invention will be more readily understood by referring to the drawings in which.

In order to secure simplicity and clarity, several distinct cooperative structures of the invention will be described independently. The machine includes a tubing or insulating mechanism, a festoon and feed device; a collapsible drum, means for rotating it, a kinematic gear train adapted to govern the extent of rotation of the drum and a brake device, which imparts a greater precision and abruptness to the stopping of the machine, after it has rotated the desired number of turns. Other features of the invention are included in the drawings and description, which will be hereinafter pointed out. The machine includes a roller or creel 12 which supplies wire braid to a tubing unit comprising a suitable mechanism 13 of conventional design for applying rubber compound to the braid and a set of driven rollers 14 for drawing the braid through the tubing device.

*Festoon and feed device*

Figures 4, 5:
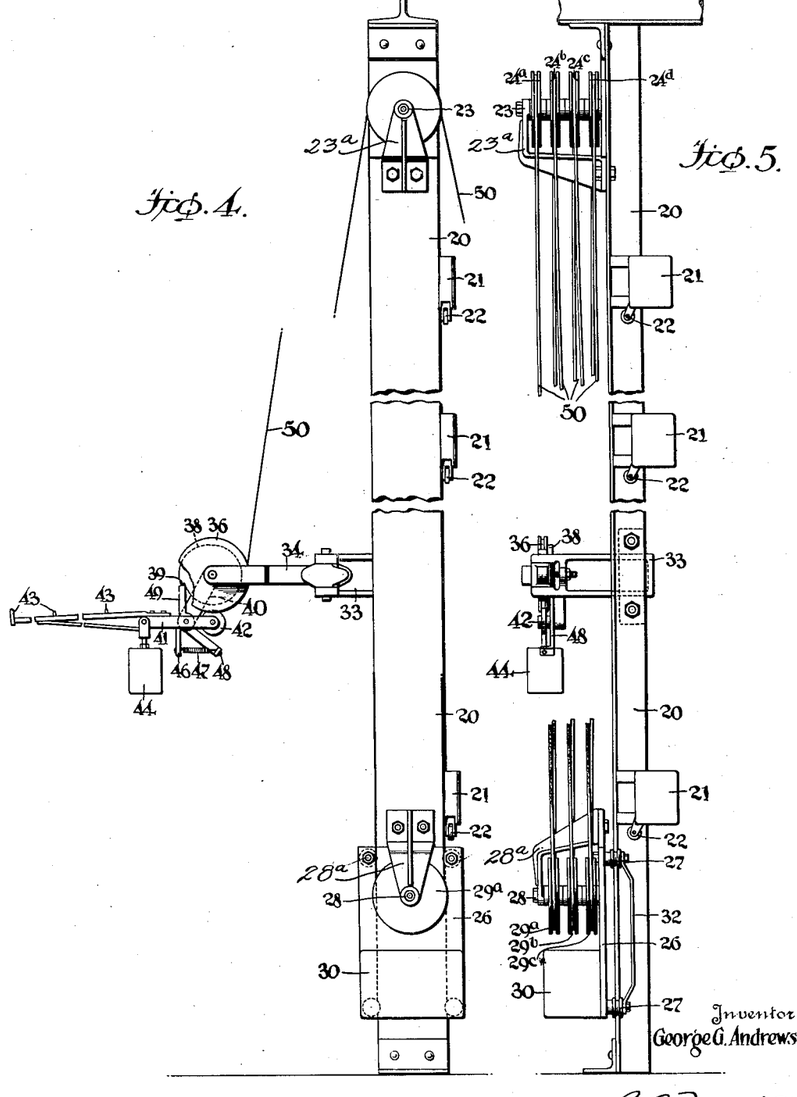
Fig. 4 is a side view of a festoon and braid feeding device which constitutes a part of the bead building machine.
Fig. 5 is an end view of the elements illustrated in Fig. 4.
Figure 10:
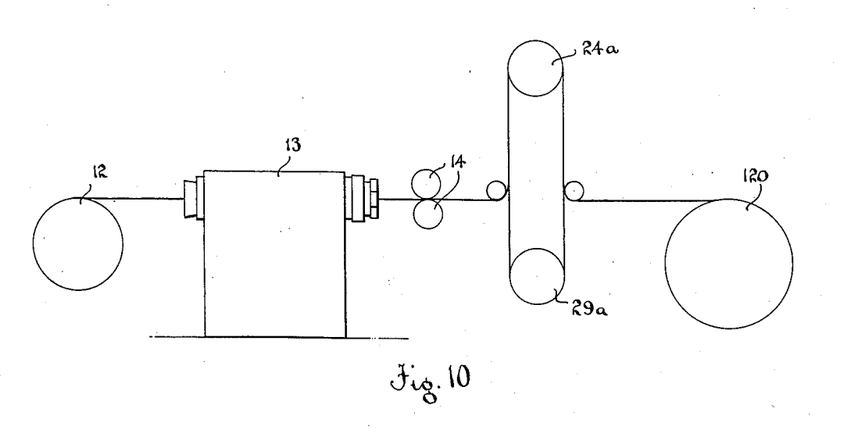
Fig. 10 is a diagrammatical view showing the arrangement of apparatus employed in practicing the invention.

The form upon which the braided wire is assembled to produce the annular product is rotated intermittently. On the other hand, it is very desirable that the operation of the tubing device, which is employed to impregnate the metallic braid with a rubber composition, be continuous. A festoon and feed device, which is particularly adapted to meet these qualifications includes a vertical T-shaped column 20 having a plurality of electrical control switches 21 secured thereto, each embodying an operating roller arm 22. Near the upper portion of the upright frame and rigidly joined thereto, is a bracket 23a supporting a shaft 23, whereon are rotatably mounted a plurality of pulleys 24a, 24b, 24c, and 24d, having grooved peripheries. Near the base of the column is a face plate 26, having four grooved rollers 27 joined thereto that are adapted to guide the plate vertically upon the edges of the T-shaped member 20. Joined to the plate is a bracket 28a supporting a shaft 28, similar to that described above, having rotatably mounted thereon a plurality of pulleys 29a, 29b and 29c of substantially the same construction as those indicated generally by the numeral 24. A weight 30 is also secured to the face plate. As the plate moves along the T-shaped beam, an extended metallic strip 32, which is secured to the mountings of the rollers 20, actuates the arms 22 of the switches 21.

A bracket 33 is secured to the frame at a convenient elevation. Its free end has a bifurcated portion, wherein it accommodates, in pivotal relation, one end of a second arm 34, the other end of which is bifurcated. A pulley 36 having a grooved peripheral contour, is rotatably mounted in the forked portion of the second arm. Integral with this pulley is a cam 38, having a sharp step-off 39. Rigidly secured to one of the forked portions of the arm 34 is a link 40, which is disposed at an angle to the vertical plane. A lever 41 is fulcrumed to the free end of the arm. At one end of the lever and rotatably mounted therein is a small roller 42, whose width is such as to permit it to engage the grooved portion of the roll 36. The other end of the lever is disposed at a slight angle to the horizontal and has a plurality of guides 43 joined thereto, through which the braid passes before engaging the drum of the building unit. A weight 44 is likewise joined to this end of the arm, and is disposed at a suitable distance from the fulcrum to provide the desired moment arm. A lug member 46, which is integral with the lever 41, has one end of a spring 47 secured thereto. The other end of the spring is secured to one arm 48 of a bell crank, which is pivoted upon the same mounting as the lever arm 41. The other arm 49 of the bell crank member is in slidable contact with the cam 38 and serves as a pawl to engage the sharp step-off 39 in the cam 38, when the pulley member is rotated in a counter-clockwise direction.

In operating this part of my machine, a rubberized braid 50 is trained over the pulley 24a, which is mounted on the upper bracketed shaft, about the oppositely disposed lower pulley 29a back to the adjacent upper pulley 24b, etc. After the wire has passed about the last pulley 24d mounted on the upper bracket, it is conducted between pulleys 36 and roller 42 and subsequently is threaded through the guide members 43. The end of the arm is somewhat below the top of the drum of the assembled unit. It will be observed, therefore, that while the braid is being wound about the drum it will have a tendency to pivot the lever 41 upwardly. By so doing, the roller 42, which is in rotatable relation with the grooved portion of pulley 36, is pivoted out of engagement with the braid. It will likewise be observed that when the braid is being fed to the drum of the building unit, pulley 36 is rotated in a clockwise direction, wherefore the pawl member 49 does not oppose the rotation of the cam 38. As soon as the movement of the braid is interrupted however, and the tension released, the weighted arm of the lever pivots downwardly and the roller 42 thereby engages the braid and insures frictional contact between the braid and the pulley 36. At the same time, due to the tension imparted by the weight of the member 30, the braid is caused to move backward and the cam 38 is rotated in a counter-clockwise direction. As soon as the pawl 48 engages the step-off portion 39, however, further movement in this direction is prevented.

The strands of metallic braid, which interconnect the several pulleys, mounted on the oppositely disposed shafts 23 and 28, are maintained taut by the weight of the member 30, which is secured to the vertically slidable face plate. As the braided wire is dispensed intermittently, the slidable member 26, together with the elements which are mounted thereon, is caused to move upwardly. To offset this the tubing machine supplies the braid continuously, and therefore has a tendency to cause the mounting to move downwardly. In order to maintain an adequate supply of braided wire and at the same time to control the operation of the tubing machine, the switches are so arranged that when the engaging member 32 actuates the arm 22 of the bottom switch 21 (and this condition exists only when an ample supply of braided wire exists), the circuit to the tubing machine motor is broken and the operation of the latter will be interrupted. As the braid is dispensed, however, and the slidable member is caused to move upwardly, the engaging member 32 actuates arm 22 of the middle switch, which initiates the operation of the tubing machine. If for any reason, the operation of this switch should fail and therefore the supply of rubberized wire braid be cut off, the movable member would continue to rise until it engages the top switch, which interrupts the movement of the entire bead building unit. In a sense, therefore, this switch may be said to be an emergency switch, inasmuch as it is never operated during the natural course of the bead fabrication.

*The bead forming and driving mechanism*

Figures 1, 6:
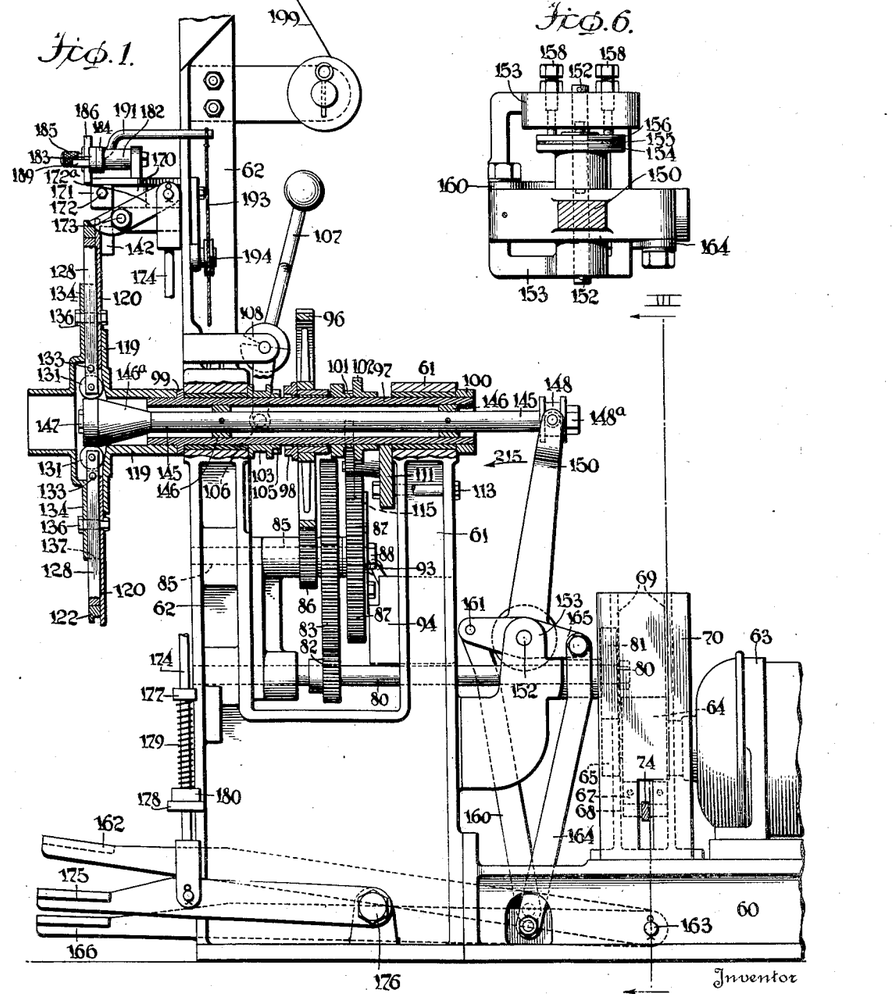
Fig. 1 is a side view, partly in section, of elements of an assembly of a machine embodying the principles of my invention.
Fig. 6 is a detail plan view, on a somewhat enlarged scale, of a portion of a foot operated collapsing mechanism.

The frame of this portion of the machine includes a base 60, together with a plurality of vertically disposed members 61 and 62, having bossed portions, housings, and brackets, that accommodate structural elements to be described later. A motor 63 is mounted on the base of the frame, and has a brake drum 64 and pinion 65 secured to the shaft thereof. A brake band 66 surrounding the drum is joined at one end 67 to a pin 68 which is supported by flanged portions 69 of a vertically disposed plate 70 that is secured to the base 60. The other end 73 of the brake band is secured to an arm 74, which is pivoted about the pin 68. A weight 75 is suspended from the arm, and is adapted to oppose the action of a solenoid 76, secured to the vertical plate 70 and the brake arm 74 by a pivotal link 77. When the arm member 74 is pivoted downwardly by the member 75, which occurs only when the solenoid is deenergized, the brake band is tightened, thereby resisting further rotatory movement of the drum 64. Upon energizing the solenoid, however, the link member 77 is actuated to raise the arm 74 together with weight 75, thereby relaxing the brake band.

Keyed to one end of a shaft 80, which is journaled in the upright portions 61 and 62 of the frame, is a gear 81 which meshes with the pinion 65. A pinion 82 is keyed to the shaft 80 and meshes with a drive gear 83, that is keyed to a shaft 85, which is rotatably maintained in the upright frame member 62. A small gear 86 is keyed to the shaft 85 at one side of the drive gear, and another gear 87 is freely mounted on the shaft, where it is maintained by a burr 88. Between the burr and the gear 87, however, and rotatably mounted on the shaft is an arm 89, one end of which is provided with an arcuate slot 90, the other end of which includes a raised portion 91. A bolt 92 passes through the slot of the arm, and fits in a tap hole in the gear. It secures the arm in any desired position within the range of the slotted portion. The raised portion of the arm is adapted to engage an arm 93 of a circuit breaking switch 94, which is mounted on the vertical member 61 of the frame. The switch controls the operation of both the motor and the solenoid. It will be observed, therefore, that the arcuate adjustment of which the arm 89 is capable, imparts a certain flexibility to the machine. By adjusting the position of the arm it is possible to break the energizing circuit at the proper time in the cycle of operation to insure that the machine will come to rest just as the winding operation is completed.

The pinion 86 meshes with a gear 96, which is loosely mounted upon a hollow shaft 97 and has secured thereto a number of protruding portions 98 that form one part of a clutch, to be described later. One end of the shaft 97, upon which this gear is mounted, is threaded and includes a shouldered portion 99, which engages its housing in the frame member 62. The other end of the shaft has a collar member 100 secured thereto, which abuts against the housing of the other frame member 61. By this construction, the shaft is secured against axial movement and, at the same time, it is free to rotate in the housings.

Two small pinions 101 and 102 of different tooth number, are keyed to the shaft on one side of gear 96. On the other side of the gear, and slidably keyed to the shaft, is a grooved collar member 103, having on the side of the collar adjacent the gear 96 and integral with the collar member a plurality of protruding portions 105, which form the complementary ring of the clutch, referred to above. A bifurcated portion 106 of a lever 107 encompasses the grooved portion of the collar 103 and is in slidable engagement with the lateral portions of the groove. The lever is pivoted in a short arm 108, which is secured to the upright portion 62 of the frame. Inasmuch as the collar 103, forming a part of the clutch, is slidably keyed to the hollow shaft 97, it will be observed that by shifting the lever 107 in an appropriate direction, the collar will engage the complementary portion of the clutch, which is secured to the freely mounted gear 96, that is driven from a pinion 86 below. Accordingly, the shaft 97 is rotated. By shifting the lever 107 in the reverse direction, the engaging portions are caused to separate and the motion of the shaft is interrupted.

A bracket 111 having a pair of aligned slots 112 (Fig. 3) is secured in adjustable relation to the upright portion 61 of the frame by bolts 113, which pass through the frame and the slots of the bracket. The bracket includes two bearings, which journal idler gear wheels 114 and 115 respectively. When the bracket is in the position illustrated in Fig. 3, gear 114 meshes with the pinion 102, which is keyed to the hollow shaft 97, and with gear 87, to which is secured the adjustable circuit breaking lug 91. By shifting the bracket, and this may be done by loosening the nuts and bolts 113 and sliding the bracket in a horizontal direction, idler gear 114 no longer meshes with its associate, but instead the oppositely disposed idler 115 interconnects gear 87 with the pinion 101 which is keyed to the hollow shaft. As has already been stated pinions 101 and 102 have different numbers of teeth. Accordingly, as one or the other drives the gear 87 its rate of rotation will depend upon the gear ratio.

A coupling 119, one of whose ends is flanged radially, is screwed upon the threaded end of the hollow shaft 97. The drum upon which the bead material is assembled is secured to the flanged portion of the coupling. It includes a disc member 120, which is immediately in engagement with and secured to the flanged portion of the coupling. The disc is provided with a set of handles 121. A ring 122 having a flange, whose outer periphery is of substantially the same diameter as the disc, is disposed adjacent to the disc member. It consists of four individual segments 123, 124, 125 and 126, the transverse faces 127 of which are all parallel. Two of the segments 123 and 125 are secured rigidly to the disc. Each of the other two segments is secured to slotted bifurcated spokes 128 by bolts 129. Within the bifurcated portion of each spoke a roller 131 is rotatably mounted.

The ring segments, together with their corresponding spoke members, and rolls, are urged radially inwardly by a set of springs 132, which interconnect the opposite ends of two transverse pins 133 that pass through the spoke member. A guide plate 134 is secured to the disc and encloses a portion of the spokes to effect a truer radial movement. Bolts 136 connect the guide plate and the disc and pass through slots 137, which are provided in the spoke members. The slots not only define the extent of radial movement, but also prevent any lateral play.

Figures 2, 7, 8:
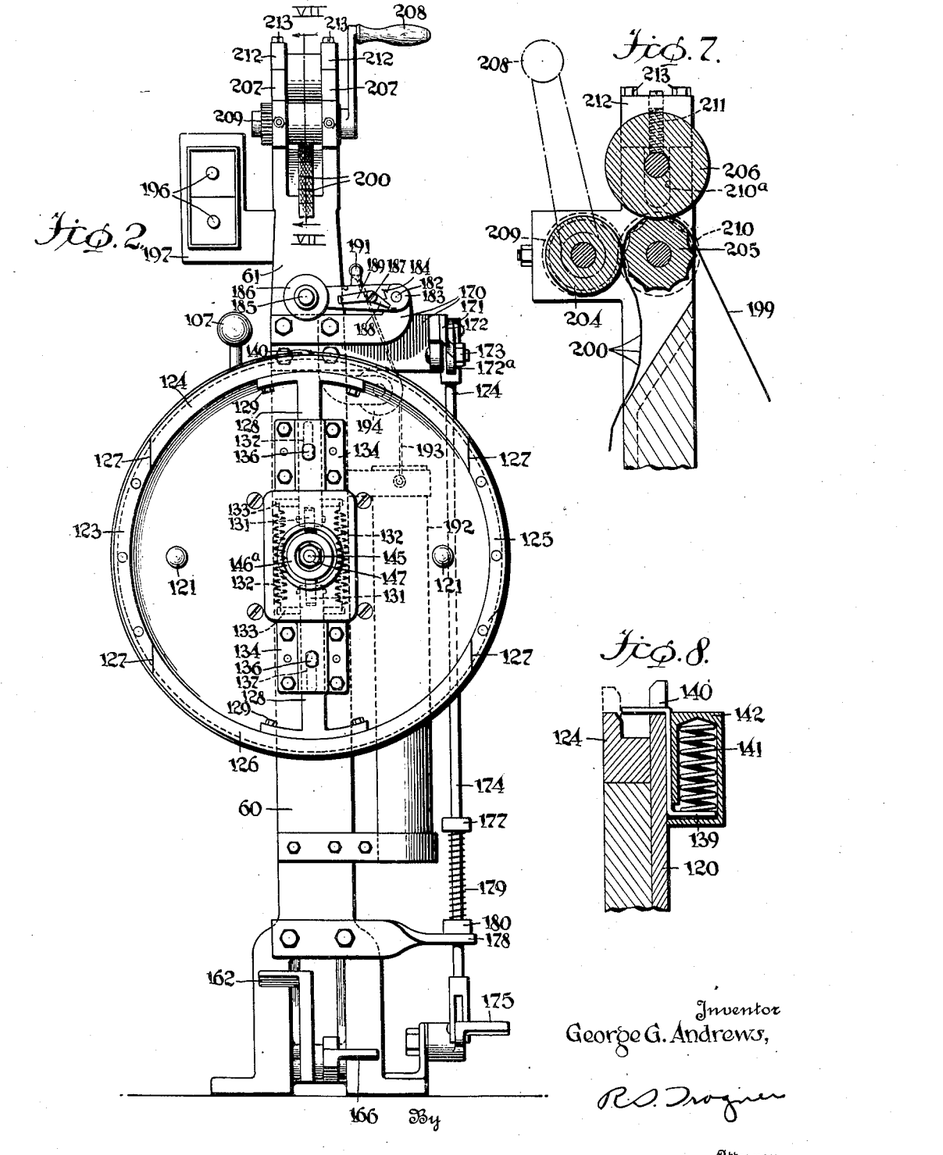
Fig. 2 is an end view of the assembly illustrated in Fig. 1.
Fig. 7 is a sectional view, likewise on an enlarged scale, of a fabric severing device taken substantially along a line VII—VII of Fig. 2.
Fig. 8 is a sectional view, on an enlarged scale, of a braid clamping mechanism.

A braid clamping arm 139 has an angular portion 140 which passes through a slot in the outer periphery of the disc 120 and extends in an axial direction to overlap the recessed portion formed by the ring segment 124 and the disc. It is resiliently secured against radial movement by a spring 141, which rests upon an extended portion of the arm and which is maintained in position by a housing 142 that is fastened to the disc. When the ring segment 124 is collapsed, as illustrated in Fig. 8, the braid of wire is inserted between the recessed portion and the angular portion 140 of the arm, after which the ring segment is moved radially into its normal position, thereby gripping the braid between the segment and the arm. It is advisable, although not essential, that the recessed portion adjacent the braid clamping arm be machined down somewhat in order that the overlapping portion of the braid material conform more closely to a true circle. Manifestly, after the desired number of convolutions of braid material are superimposed within the recess of the drum, and the fabricating operation is, in fact, completed, that portion of the braid which is gripped by the arm is freed simultaneously with the bead-form collapsing operation.

Within the hollow shaft 97 is a rod 145, which is maintained in alignment by bushings 146. At one end of the rod and in operative relation with respect to the spokes 128, which are secured to the collapsible ring segments 124 and 126, is a truncated cone 146a which is joined to the rod by a bolt 147. The lateral portion of the cone adjacent the base is substantially parallel to the axis of the cone, whereas its truncated portion is contiguous with the rod. A collar 148 having a recessed portion is secured to the other end of the rod by a bolt 148a. In slidable engagement with the recessed portion of the collar and partially encompassing the same is the bifurcated stem of a T-shaped member 150. It is pivoted about a shaft 152 which is housed in a bracket 153 that forms a portion of the frame member 61. Two discs 154 and 156 are mounted on the shaft with a leather washer 155 separating them. Disc 154 is integral with the T-shaped member, whereas disc 156 is secured against rotatory movement but may be actuated axially by adjusting set screws 158 which are tapped in the bracket 153. It will be apparent that by varying the pressure between the face plates by means of the bolts, it is possible to vary the resistance of the T-shaped member to pivotal movement.

One end of a link 160 is pivotally joined to one of the cross arms of the T-shaped member at 161; its other end is similarly connected to a pedal 162, which is pivoted in the frame at 163. A similar link 164 connects the other arm 165 of the T-shaped member to a pedal 166, which is likewise pivoted in the frame.

Figures 3, 9:
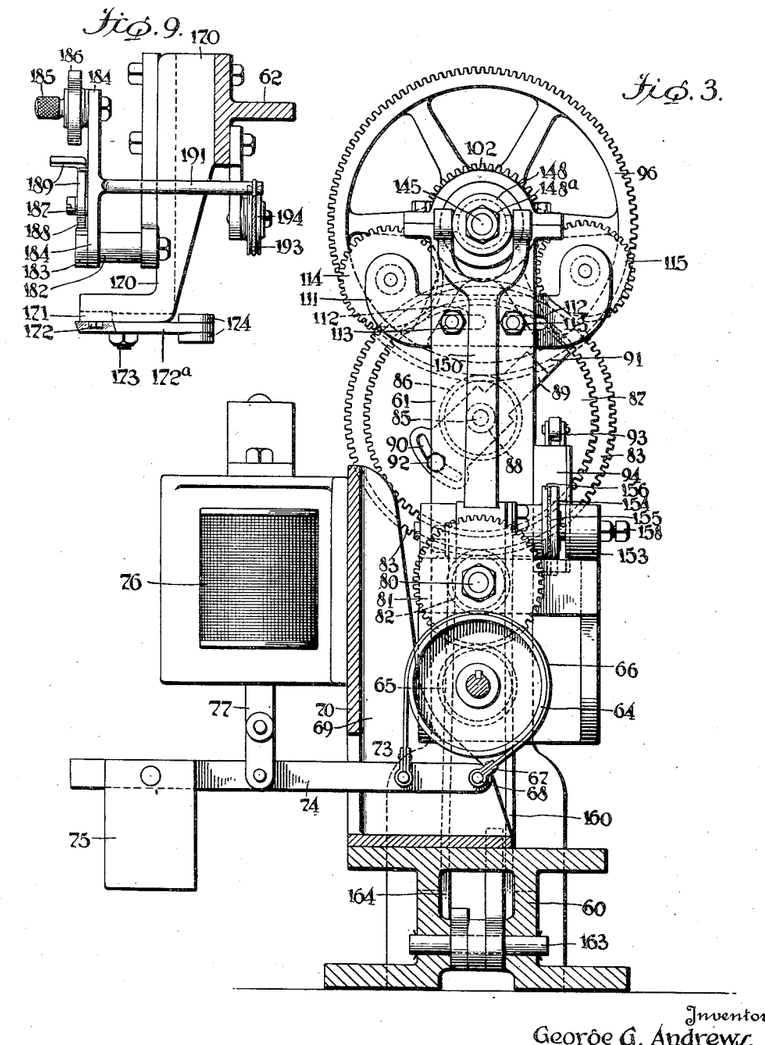
Fig. 3 is a sectional view, of the device illustrated in Fig. 1 taken substantially along a line III—III.
Fig. 9 is a detail plan view, on an enlarged scale, of a braid shear, and stitching device.

Near the top of the bead form is a bracket 170, which is secured to the upright portion 62 of the frame. A shear, which is adapted to cut the braid and a roller device, which stitches the braid within the recessed portion of the form, are mounted thereon. One of the knife portions 171 of the shear is stationary and is secured to the bracket by a bolt 172. The other knife portion 172a is pivoted about a bolt 173, which is secured in the bracket. It is actuated through a bifurcated rod 174, which is pinned to one end of the knife. The other end of the rod is pivotally secured to a pedal 175 that is fulcrumed to the frame at 176. The rod passes through two protruding portions 177 and 178 of the frame, between which is disposed a spring 179. The upper end of the spring is secured to the rod 174, whereas the lower end rests upon a washer plate 180, which surrounds the rod and is supported by the lower protruding portion 178. By virtue of this construction, the spring tends to raise the pedal as illustrated in Fig. 1, whereby the jaws of the shears are separated in readiness for a severing operation.

A short shaft 182, which is secured against rotation in the bracket 170, supports a ratchet wheel 183 that is made integral therewith. A link 184 is pivoted about the shaft and embodies a stud shaft 185 having a disc 186 mounted thereon. The free end of the stud shaft is employed as a handle and for that reason is nurled. A bell crank is fulcrumed about a short screw 187, which is secured to the link 184. One arm 188 of the bell crank acts as a pawl to engage the ratchet 183, whereas the other arm 189 has a right angle bend which serves as a handle to manipulate the pawl. A rod 191 is also secured to link 184 and supports a weight 192 by means of a cable 193. The cable passes about a guide pulley 194 that is rotatably mounted in the frame. By virtue of the weight, the link 184, together with its stitching roll 186 are at all times urged downwardly to engage the recessed portion of the annular bead form. The stitching roller may be maintained in a raised position, however, by means of the pawl 188, which engages the ratchet 183, that is mounted upon the shaft. To lower the stitching member from its raised position necessitates raising the link 184 by means of the nurled handle 185 until the pawl member is swung out of contact with the ratchet with which it is normally engaged. The link is then free to pivot downwardly. To raise the disc after a stitching operation, necessitates only raising the link upon which the disc is mounted and permitting the pawl to engage a notch in the ratchet wheel.

A switch 196, which is adapted to make and break the electrical circuit, that energizes the machine, is mounted upon an L-shaped plate 197 which is integral with the upright frame member.

At the top of the frame member is a fabric severing device, which is adapted to cut or score deeply a rubberized tape 199 into rectangular sections 200 in order that they may easily be severed from the end of the tape. These are employed to enclose the wire braid at the point where the braid is to be cut, in order to prevent the ends of the braid from unraveling. The device includes three adjoining rolls 204, 205, and 206, rotatably mounted in oppositely disposed slotted upright members 207, which constitute a part of the frame 60. Roll 204 is rotated by means of a handle 208 and drives roll 205, which has a regularly fluted periphery, through gears 209 and 210, which are secured to the ends of the respective rolls. The roll 206, which is journaled in slots 210a of the upright members, is resiliently maintained in engagement with roll 205 by a spring member 211 which engages the shaft and is held under compression by a journal plate 212 that is secured to the upright member 207 by bolts 213. The fabric strip is fed between the rolls 205 and 206 and subsequently passes between rolls 204 and 205. By means of this double pass, the textile fibers are scored or crushed between the periphery of the smooth rolls and the outer corners of the fluted portions of the roller 205.

*Operation*

To build a bead according to the principles of my invention, the end portion of a braid, about which a piece of fabric has previously been wrapped to insure against unraveling of the wires, is inserted between the clamping arm 139 and the collapsible segment 124 of the drum. Subsequently, the operator presses the pedal 166, which pivots the T-shaped arm 150, causing the cone 146a to move axially. The elements of the structure will have thereby assumed the relation indicated in Figs. 1 and 2, where the rollers 131, which are journaled in the bifurcated spokes 128, are in engagement with that portion of the cone 146a whose sides are substantially parallel to the axis thereof. The lever 107, which operates the clutch is then pivoted in a counter-clockwise direction as viewed in Fig. 1, whereby the clutch segments 98 and 105 are caused to intermesh. The motor 63 is then energized by pressing the switch 196, thus causing the bead form to rotate and accumulate thereon a plurality of turns of the braided wire which is supplied from the festoon through the feeding devices. At the same time, the core of the solenoid 76 is so energized that the lever 74 is raised thus releasing the brake band 66. The power is transmitted from the motor through shaft 80 to shaft 85 by means of pinions and gears 65, 81, 82, and 83. Pinion 86, which is keyed to the shaft 85 drives gear 96 which is freely mounted on the hollow shaft 97. The power is transmitted through the clutch into the hollow shaft and thence to the bead form. At the same time, the gear 102, which forms a part of the kinematic train of gears 102, 114, and 87, rotates the adjustable arm 89, the raised portion 91 of which is adapted to operate the circuit breaking switch 94 by actuating its arm 93. At this instant the motor is stopped and simultaneously therewith the weight 75, which is mounted upon the brake lever 74, overcomes the lifting effect of the solenoid 76, which is no longer energized, causing the lever 74 to pivot downwardly and thereby tensioning the brake band 66.

A rectangular section 200 of the rubberized fabric, which has been prepared by passing the tape 199 through the severing rolls 204, 205 and 206, is wrapped about the wire at the point where it is to be cut. By pressing the pedal 175, the jaws of the shear are operated and the braid is thereby severed. That end of the braid which is adjacent the festoon and feeding device is then released, and the lever arm 41 of the feeding device is thereby pivoted downwardly, causing its roller 42 to engage the braid, thus insuring frictional contact between the braid 50 and the roll 36. As soon as the pawl member 49 engages the shoulder 39 of the cam it prevents further counter-clockwise movement as has already been described.

The stitching roll 186 is then lowered by releasing the pawl 188 and pivoting the lever downwardly. After disengaging the clutch by shifting the lever 107, the disc 120 may be rotated with the aid of the handles 121. Any additional filling material, such for example as unvulcanized hard rubber composition, may be applied conveniently at this time. The stitching operation having been completed, the lever 184 is pivoted upwardly and secured in a raised position, after which the pedal 162 is pivoted downwardly, thereby rocking the T-shaped member in the direction indicated by the arrow at 215. The spokes 128 of the collapsible segments 124 and 126 of the drum, which are resiliently maintained against the lateral surface of the cone 146a, are thereby permitted to approach each other. As the cone is moved outwardly the segments move radially inwardly thereby facilitating the removal of braided wire ring, after which the building cycle is repeated.

Obviously, certain modifications in the structure of the various elements which constitute the machine hereinabove described may be made without departing from the scope of the principles of my invention. Thus, for example, a bead-form, only one of whose segments is collapsible may be employed. The structure described, having two radially movable segments, is to be preferred, inasmuch as the annular rubberized braid is thereby subjected to less distortion in removing it from the form. Likewise, the mechanism for the drum or core which is operated by the foot lever 162 and 166 may be modified, to permit manual operation. Inasmuch as the rapidity of operation is dependent in part upon the ability of the operator to manipulate several of the structural elements simultaneously, the pedal operated mechanism is preferable.

It will be observed that gear 87 is actuated through the idler 114 by the pinion 102, which is keyed to the hollow shaft. When the other idler 115 is in operative relation, the pinion 101, which is likewise keyed to the hollow shaft and which embodies a lesser number of teeth than pinion 102, will drive the gear. Under these conditions the timing gear 87 will be rotated less rapidly, wherefore the adjustable arm 91, which is mounted thereon, will engage the circuit breaking switch only after a greater number of revolutions of the bead-form than when the larger sprocket 102 is employed. Accordingly, the operator may employ either pinion 101 or 102 to drive the gear 87, depending upon the number of revolutions of the bead form desired, which number obviously depends upon the number of plies desired in the bead. This gear train likewise may be replaced by an equivalent structure without departing from the spirit of the invention, since various means may be provided to control the extent of its rotation.

The brake appliance and its solenoid, which is connected to the same circuit as the motor drive, enables greater precision in stopping the form after it has completed its last revolution. This entails considerable saving in material and, at the same time, minimizes the interlude, during which the kinematic energy of the machine is overcome, after the electrical circuit has been broken.

From the foregoing, it will be apparent to those skilled in the art that my invention is susceptible of a large number of modifications without departing from its spirit and scope, and I desire, therefore, that it be limited only to accord with prior art and the appended claims.

What I claim is:

1. In a bead building machine that includes a source of power and means for controlling its operation, a rotatable drum having a plurality of movable peripheral segments, each including a radial member, one end of which is joined thereto and the other end having a roll member resiliently maintained in engagement with the lateral surface of a cone co-axially disposed with respect to the drum and movable in a direction parallel to the axis of the drum.

2. In a machine for building beads of elongate material having a rotatable drum upon which the material is assembled and means for rotating the drum, a clamping means mounted on the drum for engaging and securing the initial end of the elongate material.

3. In a machine for building beads of elongate material having a collapsible drum upon which a bead is assembled and means for rotating it, means in cooperative relation with the collapsible drum for securing the initial end of the elongate material to the periphery of the drum.

4. In a machine for building beads of elongate material having a collapsible drum upon which a bead is assembled and means for rotating it, means in cooperative relation with the collapsible drum for securing the initial end of the elongate material to the periphery of the drum, said means being adapted to release the material automatically when the drum is collapsed.

5. In a machine for building beads of an elongate material embodying a rotatable drum about which the bead is assembled and means for rotating the drum, an arm member cooperatively disposed with respect to the drum and adapted to secure the initial end of the elongate material to the rotatable drum.

6. In a machine for building beads of an elongate material embodying a drum having a plurality of collapsible segments upon which the bead is assembled and means for rotating the drum, an arm stationarily disposed with respect to the collapsible segments and in cooperative relation therewith adapted to secure the initial end of the elongate material between said arm and the collapsible segments.

7. A ring for receiving convolute windings of material, said ring comprising sectors which form a complete ring, means for contracting and expanding the ring, and gripping jaws for the material to be wound upon the ring operable to clamp the material upon the expansion of the ring.

8. A machine for winding flexible material comprising a tubular rotatably mounted spindle, a disc non-rotatably secured upon the spindle, segments constituting a circular configuration secured to a side of the disc, certain of the segments being secured in fixed relation, while others are movable inwardly and outwardly, the segments having peripherally extending grooves formed therein which mate with the side of the disc to form a channel having a cross-sectional contour of U-shape, a shaft mounted for longitudinal motion within the hollow spindle, means operatively interconnecting the movable segments and the shaft for moving the segments inwardly and outwardly upon reciprocation of the shaft, and means for reciprocating the shaft.

9. A machine for constructing beads for pneumatic tires comprising a drum, means for rotating the drum, means for mechanically securing the end of a strand of bead tape upon the drum, and means for stopping rotation of the drum after a predetermined number of revolutions.

10. A machine for constructing beads for pneumatic tires comprising a drum, means for rotating the drum, means for holding the end of a bead tape upon the drum during the winding operation, and means for severing the tape after a predetermined number of convolutions have been wound upon the drum.

11. A machine for constructing beads for pneumatic tires comprising a rotable drum, a clamp for securing the end portions of bead tape mounted upon the drum, means for rotating the drum a predetermined number of revolutions and means mounted exteriorly of the drum to cause the clamp to engage and disengage the tape.

12. In a machine for building tire beads from rubberized wire tape, the combination of a rotatable ring, a pressure roller arranged to cooperate continuously with the ring in winding the wire tape thereon, and a cutter arranged to sever the tape near the finish of the winding operation.

13. In a machine for building tire beads from rubberized wire tape, the combination of a rotatable ring, a pressure roller arranged to cooperate continuously with the ring in winding the wire tape thereon, means for driving one and through it the other of said elements in carrying out the bead winding operation, and a cutter adapted to be operated after a predetermined number of revolutions of the ring to sever the tape.

14. In a machine for building tire beads from rubberized wire tape, the combination of a rotatable ring, a pressure roller arranged to cooperate with the ring in winding the wire tape thereon, means for driving one and through it the other of said elements in carrying out the bead winding operation, said ring being provided at a point near its outer periphery with means to receive the leading end of the wire tape and anchor it to the ring.

15. In apparatus of the character described, in combination, means for applying rubber compound to bead wire, a festooning device for receiving said wire after the rubber compound has been applied thereto, means for drawing the wire from said first named means into the festooning device, and a forming drum for receiving the wire from the festooning device.

16. In apparatus of the character described, in combination, a source of supply of bead wire, a tubing unit for applying rubber compound to the bead wire, a festooning device for receiving the wire after it leaves the tubing unit, means for drawing the wire from the source of supply through the tubing unit and into the festooning device, and a forming drum for intermittently receiving the wire from the festooning device.

17. In apparatus of the character described, in combination, means for applying rubber compound to bead wire, means for receiving said wire after the rubber compound has been applied thereto and for storing up a predetermined quantity thereof, and a bead forming member for intermittently receiving said wire from said last named means.

18. In apparatus of the character described, in combination, means for applying rubber compound to bead wire, means for continuously drawing said wire through said first named means, a festooning device for continuously receiving said wire after the rubber compound has been applied thereto, and a bead forming member for intermittently receiving said wire from the festooning device.

In witness whereof, I have hereunto signed my name.

GEORGE G. ANDREWS.